United States Patent [19]

van Heel

[11] 4,250,885
[45] Feb. 17, 1981

[54] METHOD AND APPARATUS FOR UTILIZING SOLAR HEAT FOR HEATING A BUILDING

[75] Inventor: Joannes M. van Heel, Rotterdam, Netherlands

[73] Assignee: Stichting Bouwcentrum, Netherlands

[21] Appl. No.: 883,060

[22] Filed: Mar. 3, 1978

[30] Foreign Application Priority Data

Mar. 4, 1977 [NL] Netherlands ............... 7702356

[51] Int. Cl.³ .................................... F24J 3/02
[52] U.S. Cl. ............................ 126/430; 126/400; 126/427
[58] Field of Search ............ 126/400, 271, 270, 375, 126/430, 427; 165/104 S; 122/35; 237/1 A, 55

[56] References Cited

U.S. PATENT DOCUMENTS

| | | | |
|---|---|---|---|
| 2,484,127 | 10/1949 | Stelzer | 237/1 A |
| 2,680,565 | 6/1954 | Löf | 237/1 A |
| 4,111,359 | 9/1978 | Trombe | 128/430 |
| 4,147,300 | 4/1979 | Milburn | 126/400 |

FOREIGN PATENT DOCUMENTS

| | | | |
|---|---|---|---|
| 83447 | 2/1954 | Norway | 237/55 |
| 931091 | 7/1963 | United Kingdom | 237/55 |

*Primary Examiner*—Samuel Scott
*Assistant Examiner*—Gerald Anderson
*Attorney, Agent, or Firm*—Watson, Leavenworth, Kelton & Taggart

[57] ABSTRACT

Apparatus for utilizing solar heat for heating a building, comprising a collector, a storage unit and means for transporting heated air from the collector to the storage unit and hence to rooms in the building, the apparatus being installed in the building so that the heat storage unit adjoins at least some of the rooms to be heated and comprises conduits terminating in said rooms.

13 Claims, 6 Drawing Figures

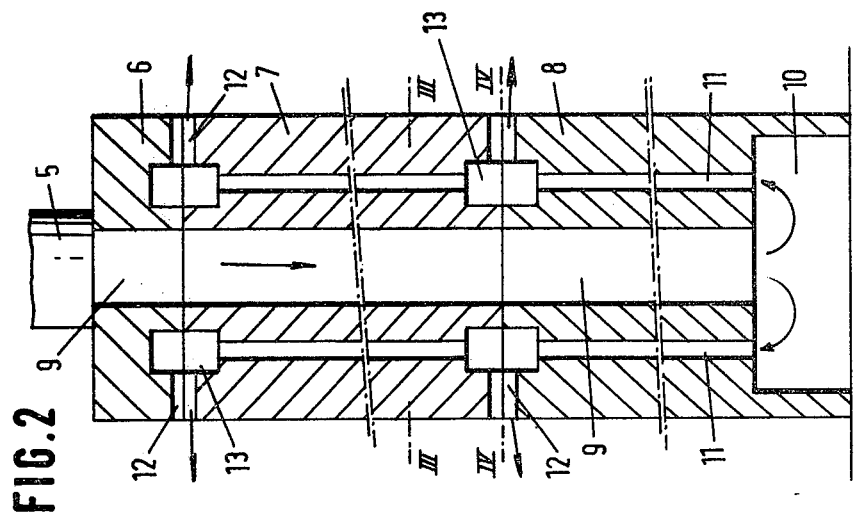
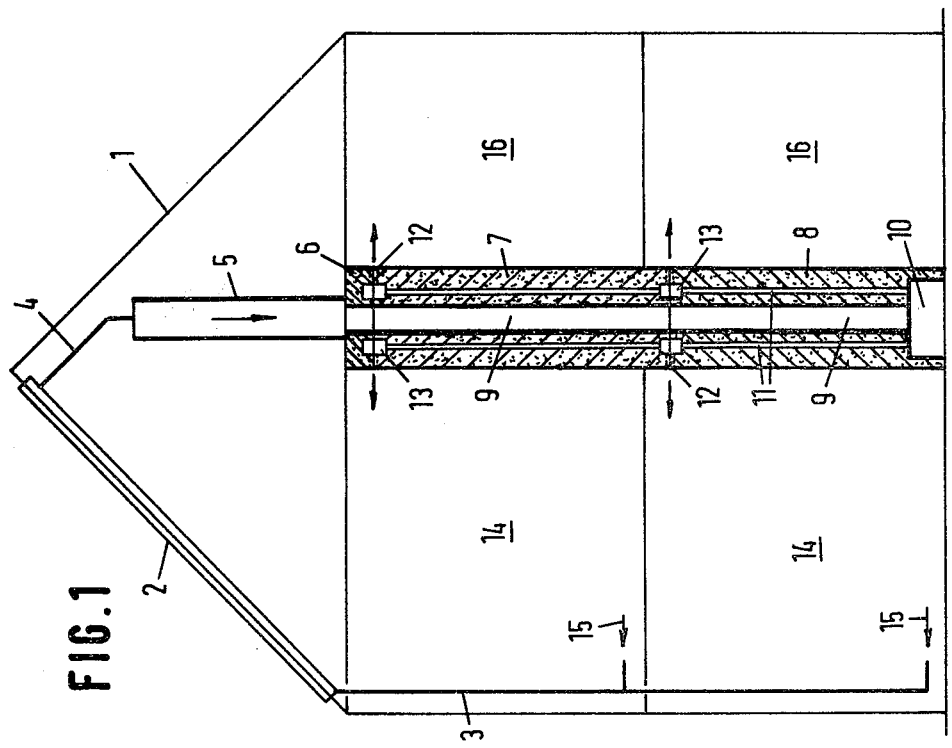

METHOD AND APPARATUS FOR UTILIZING SOLAR HEAT FOR HEATING A BUILDING

This invention relates to a method of heating a building, in particular a house, by means of solar energy, which comprises collecting the radiant heat from the sun by means of a collector, and transporting it by means of an air stream from the collector to rooms to be heated.

There are various known systems for heating a building, in particular a house, by means of solar energy. If air is used as the heat transporting medium for transporting the heat from the collector to the rooms to be heated, it is possible for the heated air to be conducted through conduits direct to the rooms concerned, so that the hot air can flow into the rooms.

Often, however, it is desirable that the heat collected by means of the solar collector is not passed direct to the rooms concerned, but temporarily stored. The air heated in the solar collector should then be transported to a heat storage unit in which a storage medium can retain the heat for a desired period of time. As a storage medium can be used a liquid, such as water, a substance which when heat is supplied at a desired temperature passes from the solid into the liquid phase, or a solid, such as concrete, gravel, rubble.

The present invention relates to a system in which air heated in the collector is passed to the rooms to be heated and flows into these rooms, and in which it is also possible to store at least a portion of the energy collected by the solar collector in order that the heat stored may be used for heating rooms during periods in which the sun does not shine.

If such a system is used in an area in which only a relatively minor proportion of the energy required for heating purposes can be collected via a solar collector, it is of great importance that the solar-energy heating-system should be inexpensive and virtually free of maintenance. It is an object of the present invention to provide a method of heating a building by means of solar energy, in which solar heat is distributed and stored in an effective manner, and in which the rooms concerned are heated in an inexpensive manner.

This object is achieved according to the present invention in that the radiant heat from the sun, which is collected by means of a collector and passed from the collector to the rooms to be heated by means of an air stream, is transported via a heat-storage unit adjoining the rooms to be heated. The incorporation of the distribution channels to the various rooms into the heat-storage unit, which unit adjoins the rooms to be heated, results in a system of quite simple design, which on the one hand enables heated air to be conducted virtually direct to the rooms to be heated, while a surplus of heat can be stored, and in which the rooms are heated both by inflowing air and by radiant heat from the heat-storage unit.

When the sun begins to shine there is first of all a need for rapid utilization of the collected radiant heat from the sun. This is possible by bringing about relatively fast air circulation through the collector and the storage unit, so that the heat collected by the collector is rapidly carried off by air of moderately high temperature, which air is transported to the desired rooms and during this transport gives off relatively little heat to the heat-storage unit. When the desired temperature in the room or rooms has been reached in this manner, the rate of circulation of the air through the collector and the storage unit can be reduced, whereby the air is brought to a higher temperature level in the collector and in passing the heat-storage unit gives off relatively much air to this unit. The air circulation can be realized by using a known per se fan, preferably of the variable type, which may be arranged at any suitable place in the system, for example, in an additional air heating unit capable of giving off additional heat to the stream of air before it enters the storage unit.

According to another feature of the present invention, the air flows centrally through the heat-storage unit, from above downwardly, and is subsequently conducted through the heat-storage unit to the rooms concerned through conduits located radially outwardly from the central conduit or conduits. The effect is that the heat is stored in the storage unit primarily in the central portion thereof and that the air traverses a relatively long path through the storage unit. Preferably the air is caused to flow into the rooms concerned through adjustable grids, so that the air circulation can be affected by such grids.

Among the advantages of the method described are the following. The rooms are heated both by supply of hot air and by radiation. After the sun has begun to shine, the heat collected can be rapidly utilized by direct supply of heated air to the rooms. In spite of its simplicity, an effective control of the amount of heat directly used and heat stored is possible. As the storage unit is arranged centrally in the house to adjoin the rooms to be heated, a very high efficiency can be obtained. The storage unit can be regarded as an integrated part of the building.

The invention further relates to an apparatus for transporting and distributing air heated in a solar heat collector to rooms to be heated, which apparatus according to the invention is provided with means for transporting the heated air from the collector to a heat-storage unit, which heat-storage unit adjoins rooms to be heated and is provided with conduits terminating in the rooms to be heated. In a preferred embodiment of the present invention the heat-storage unit comprises a central duct for conducting the air from above downwardly, and conduits located radially outwardly from said central duct for conducting the air to the rooms concerned. According to another feature of the invention the heat storage unit consists essentially of gravel concrete.

According to another preferred feature of the invention, the storage unit comprises a plurality of stacked elements, with the upper or uppermost element being provided with an inlet for the supply of heated air. The storage unit may thus be assembled from a plurality of prefabricated building elements, each provided with the required conduits.

A major advantage of the apparatus described is that it virtually requires no maintenance.

One embodiment of the apparatus according to the present invention will now be described, by way of example, with reference to the accompanying diagrammatic drawings. In said drawings, FIG. 1 shows a house in cross-section;

FIG. 2 shows a heat-storage and distribution unit provided in the house shown in FIG. 1;

In the various figures, corresponding parts are designated by the same reference numerals. All figures are diagrammatic illustrations.

Figure 3:
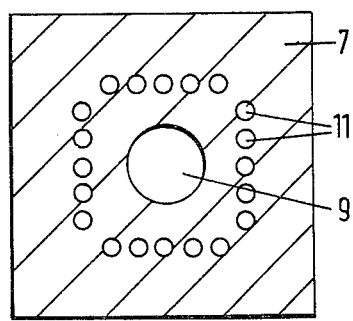
FIGS. 3 and 4 are cross-sectional views on the lines III—III and IV—IV, respectively, of FIG. 2.
Figure 4:
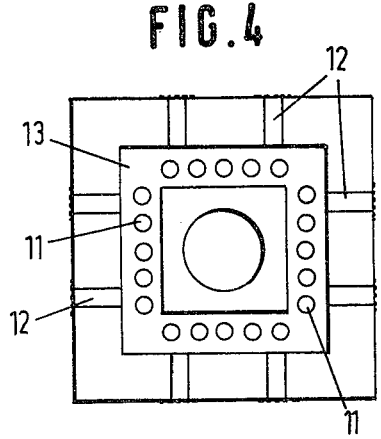

The house shown in FIG. 1 has a gable roof 1 provided on the south side with a collector 2 for collecting solar radiation. Collector 2 is designed so that the solar heat collected is given off to air which through conduit 3 flows to collector 2 and leaves the latter through conduit 4. Conduit 4 passes the air to an apparatus 5 comprising means for adding additional heat to the air, should this be desirable. From apparatus 5, the air flows to a heat-storage and distribution unit comprising a top section 6, an intermediate section 7 and a bottom section 8. Sections 6, 7 and 8 consist of gravel concrete and each exhibit a central duct 9 for transporting the air downwardly. Sections 6, 7 and 8 are stacked one upon the other with a sealing or bonding agent being interposed as desired. Top section 6 is connected to apparatus 5, and bottom section 8 is provided at the bottom with a reversing space 10, in which the direction of flow of the air supplied through the central conduit 9 is reversed, and subsequent to which the air flows upwardly through a number of ducts 11 to enter the rooms concerned through outlets 12. Ducts 11 are located radially outwardly from the central conduit 9 and terminate in headers 13, which, as best shown in FIG. 4, are arranged around the central conduit 9. From headers 13, the air can flow to the rooms through outlets 12. As shown in FIGS. 3 and 4, the storage unit may have a square cross-sectional configuration of, for example, 90 by 90 cm. Naturally, any other cross-sectional configuration of the storage unit is conceivable, for example, round or rectangular.

The direction of flow of the air is indicated by arrows in FIGS. 1 and 2. As shown in FIG. 1, the air enters each room 14 adjacent to the ceiling, and leaves the rooms through conduit 3, as indicated by arrows 15. The air can be dishcarged from rooms 16 through a system of conduits not shown.

Figure 5:
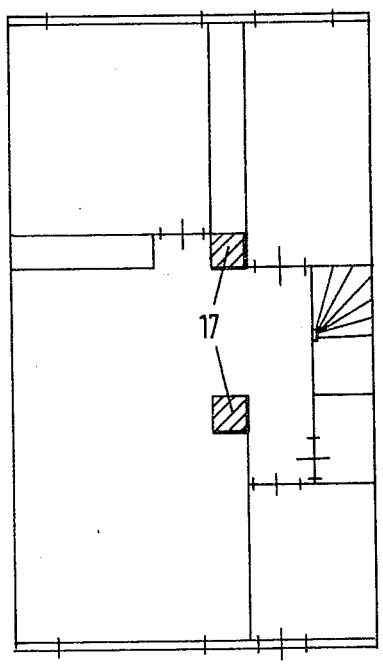
FIGS. 5 and 6 are planviews of a house.
Figure 6:
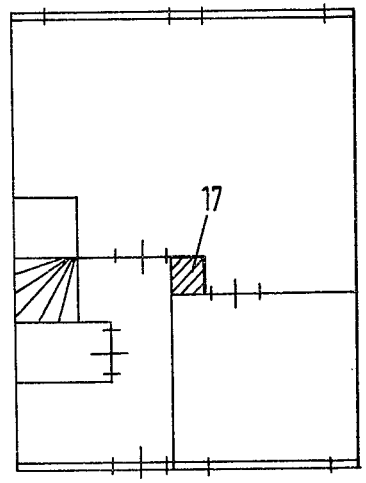

FIGS. 5 and 6 show planviews of houses heated with the heat-storage unit according to the present invention. The rooms are arranged so that each room adjoins a portion of at least one heat-storage unit 17, diagrammatically shown as hatched squares. By virtue of this arrangement the rooms are also heated by radiant heat.

The operation of the apparatus is as follows. As soon as the sun begins to shine air is blown through collector 2 by a fan not shown. The air is warmed up in collector 2 and subsequently passes apparatus 5 where it is brought to a higher temperature level, should this be desired. Subsequently the warm air flows through the heat-storage and distribution unit 17, first from above downwardly through the central conduit 9 and subsequently via reversal space 10 through ducts 11 in the upward direction. From header 13 the air then flows through outlet 12 into the rooms to be heated. These outlets 12 may be provided with adjustable air grids.

After the sun has begun to shine, it is first of all of importance that the heat collected by the collector is utilized as fast as possible for heating the rooms concerned. For that purpose air can be passed through the collector relatively rapidly, the result being that the collected heat is rapidly carried off by means of air having a relatively low temperature level, for example, 35° C. During this relatively fast transport, relatively little heat is given off by the air as it flows through the heat-storage and distribution unit, so that the rooms are "directly heated". When the rooms have been brought to a sufficient temperature level, so that heat is only required for maintaining this temperature, the flow velocity of the air through the collector can be reduced, so that the air stream reaches a relatively high temperature level, for example 90° C., and the air subsequently flows through the heat-storage and distribution unit at such a rate that the heat is for a large part given off by the air to the concrete of the unit. The air circulation can be controlled by means of an adjustable fan, optionally in combination with adjustable air grids which may be arranged in outlet 12. By means of these grids the heat input can be adjusted for each individual room.

If desired, the heat can also enter the rooms in the form of radiant heat, which can be achieved by selectively providing the outer wall of the unit, possibly locally, with an insulating layer. It is also possible, in order to control the amount of radiation, to control the insulation, for example, by means of a movable insulating screen.

When the sun does not shine, the heat present in the storage unit can be passed to the rooms by effecting air currents similar to those described. In that case the stream of air need not be passed through the collector. If heating apparatus 5 is provided with a fan for air transport, conduit 4 can be disconnected for the purpose, so that interior air is directly drawn in by apparatus 5.

It will be clear that, if desired, the length of the conduits in the storage system can be changed, for example by changing the path to be traversed by the air. Thus, for example, the air can be caused to pass the unit in the vertical direction more than once.

I claim:

1. In an apparatus for utilizing solar heat for heating a building, comprising a solar collector and a heat-storage unit, means for transporting heated air from said collector to said heat-storage unit, and means for transporting and distributing air heated in the collector to rooms in said building to be heated, the improvement wherein said heat-storage unit is disposed separately from said collector and integrally within said building such that the heat storage unit adjoins the rooms to be heated, said heat-storage unit comprising passage means in communication with said collector for passing said heated air through said storage unit for storage of heat therein; and conduits being essentially formed in said heat-storage unit and communicating with said passage means, so that said conduits communicate with said collector by way of said passage means, said conduits terminating in said rooms for distribution of said heated air thereto.

2. Apparatus according to claim 1 wherein the passage means of said heat-storage unit comprises a vertically extensive central conduit, the top end of said central conduit being in communication with said collector for conducting the air from said collector downwardly through said heat storage unit, and wherein said conduits terminating in the rooms are disposed radially outwardly from said central conduit.

3. Apparatus according to claim 1, wherein the heat storage unit consists essentially of gravel concrete.

4. Apparatus according to claim 1, wherein the conduits terminating in the rooms comprise adjustable grids.

5. Apparatus according to claim 2, wherein the heat-storage unit comprises a plurality of vertically stacked elements having ducts therein, the ducts of said elements cooperatively constituting said conduits, the uppermost of said elements comprising connecting means for the supply of heated air.

6. Apparatus according to claim 1, wherein said solar collector is disposed externally on said building for exposure to the sun and wherein said heat-storage unit is disposed internally in said building such that it adjoins a plurality of rooms.

7. Apparatus according to claim 1, wherein the outer walls of said heat-storage unit form a portion of the walls of the rooms to be heated, further comprising means for selectively exposing portions of said outer walls to thereby heat said rooms by radiation from the heat energy stored in said heat-storage unit.

8. Apparatus according to claim 7, wherein said selectively exposing means comprises a movable screen comprising a layer of thermally insulating material.

9. Apparatus according to claim 2 wherein said conduits terminating in the rooms extend vertically in said heat-storage unit and each such conduit communicates with the central conduit at the bottom of the heat-storage unit so that heated air passing from said collector to the rooms must first flow downwardly through said central conduit and then upwardly through said conduits terminating in the rooms.

10. A method of heating a building by means of solar energy, which comprises collecting the radiant heat from the sun by means of a solar collector, and transporting said heat from the collector to rooms to be heated by means of a stream of air, wherein the improvement comprises:

distributing a portion of the heat from the heated air directly to said rooms by distribution means disposed within the rooms to be heated, and storing a portion of the heat from the heated air in said distribution means, said distributing and storing being effected by passing said heated air through a heat-storage unit adjoining the rooms to be heated, the air being passed through a central duct in the heat-storage unit from above downwardly and subsequently being passed through conduits extending radially outwardly from said central duct through the heat-storage unit for distribution of heated air to the rooms.

11. A method according to claim 8, wherein the air is passed into the rooms through adjustable grids.

12. A method according to claim 10, wherein the air is transported from said collector to said heat-storage unit at a relatively rapid flow rate whereby a negligible amount of heat is transferred to the heat-storage unit, the greater amount of heat being distributed to the rooms for raising the temperature thereof.

13. A method according to claim 12, wherein upon reaching a predetermined room temperature the flow rate of said transported air is reduced to a relatively slow rate whereby an amount of heat is distributed to the rooms for substantially maintaining said temperature, the greater amount of heat being transferred to said heat-storage unit.

* * * * *